(12) United States Patent
Fukuyama et al.

(10) Patent No.: US 6,231,473 B1
(45) Date of Patent: May 15, 2001

(54) TOROIDAL CONTINUOUSLY VARIABLE TRANSMISSION

(75) Inventors: Masatoshi Fukuyama, Fuji; Toshifumi Hibi, Yokosuka; Toshikazu Oshidari, Yokosuka, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/382,666

(22) Filed: Aug. 25, 1999

(30) Foreign Application Priority Data

Aug. 28, 1998 (JP) ................................................ 10-243803

(51) Int. Cl.⁷ ............................. F16H 13/10; F16H 15/38
(52) U.S. Cl. ................................................. 476/45; 476/40
(58) Field of Search .................................. 476/45, 41, 40, 476/42, 43, 48, 46

(56) References Cited

U.S. PATENT DOCUMENTS

| 4,893,517 | * | 1/1990 | Nakano | .................................. | 74/200 |
|---|---|---|---|---|---|
| 5,027,669 | * | 7/1991 | Nakano | .................................. | 74/200 |
| 5,651,750 | * | 7/1997 | Imanishi et al. | .................... | 476/40 |
| 5,679,090 | * | 10/1997 | Imanishi | .................................. | 476/42 |
| 5,984,826 | * | 11/1999 | Nakano | .................................. | 476/45 |

FOREIGN PATENT DOCUMENTS 7-158711    6/1995  (JP) .
41-1201254 * 7/1999 (JP) .

* cited by examiner

Primary Examiner—Sherry Estremsky
Assistant Examiner—Tisha D. Lewis
(74) Attorney, Agent, or Firm—Foley & Lardner

(57) ABSTRACT

A preloading mechanism (16) of a toroidal continuously variable transmission applies a predetermined preload to disks (1a, 1b, 2a, 2b) by belleville springs (9a, 9b). The input disk (1b) displaces in such a compressing direction of the belleville spring (9a) as the speed ratio increases. The displacement of the input disk (1b) is limited by a spacer (50), so the clearance (S) of the belleville springs (9a, 9b) is never zero and a large force is prevented from acting on the belleville springs (9a, 9b).

2 Claims, 5 Drawing Sheets

TOROIDAL CONTINUOUSLY VARIABLE TRANSMISSION

FIELD OF THE INVENTION

The present invention relates to a toroidal continuously variable transmission for vehicles.

BACKGROUND OF THE INVENTION

Tokkai Hei 7-158711 published by the Japanese Patent Office in 1995 discloses a toroidal continuously variable transmission (toroidal CVT) for vehicles wherein the ratio of a rotation speed of an input disk relative to the rotation speed of an output disk, i.e., a speed ratio, is continuously varied by varying the gyration angles of a pair of power rollers gripped between the input disk and the output disk.

The power rollers are respectively supported by trunnions. When the trunnions are respectively displaced in an axial direction by hydraulic actuators, the gyration angles of the power rollers vary accordingly.

SUMMARY OF THE INVENTION

In order to grip the power rollers between the input disk and the output disk in the toroidal CVT, a thrust load must be made to act on the input disk and output disk. In general, the thrust load in proportion to the torque input into the transmission is generated by loading cams.

Further, as the loading cams do not generate the thrust load when the torque input into the transmission is zero, a preloading mechanism is provided apart from the loading cams, and a predetermined preload is exerted on the input disk and output disk. In the aforesaid prior art, the preloadig mechanism comprises two belleville springs (a pair of coned disk springs) which directly push the input disk.

However, the position of the input disk in the axial direction changes according to the gyration angles of the power rollers inserted between the input disk and output disk. In the position in which the input disk has retreated to its maximum extent, a large compression force acts on the belleville springs and the springs come into close contact If the input torque becomes large in this state, the input disk deforms and the belleville springs and input disk rub against each other. The belleville springs will wear out, if such a phenomenon frequently occurs.

It is therefore an object of this invention to prevent a large force from acting on the belleville springs of the preloading mechanism, and to prevent the belleville springs from rubbing against a disk so as to prevent wear of the belleville springs.

In order to achieve the above object, this invention provides a toroidal continuously variable transmission comprising an input disk, an output disk, a power roller gripped between the input disk and the output disk, a loading mechanism which generates a thrust load according to an input torque input into the transmission, and applies the thrust load to the disks, an elastic member which comes in contact with a specific disk of the disks and applies a preload to the disks and a limiting member which limits a displacement of the specific disk in a compressing direction of the elastic member.

The details as well as other features and advantages of this invention are set forth in the remainder of the specification and are shown in the accompanying drawings.

DESCRIPTION OF THE PREFERRED EMBODIMENTS

Figure 1:
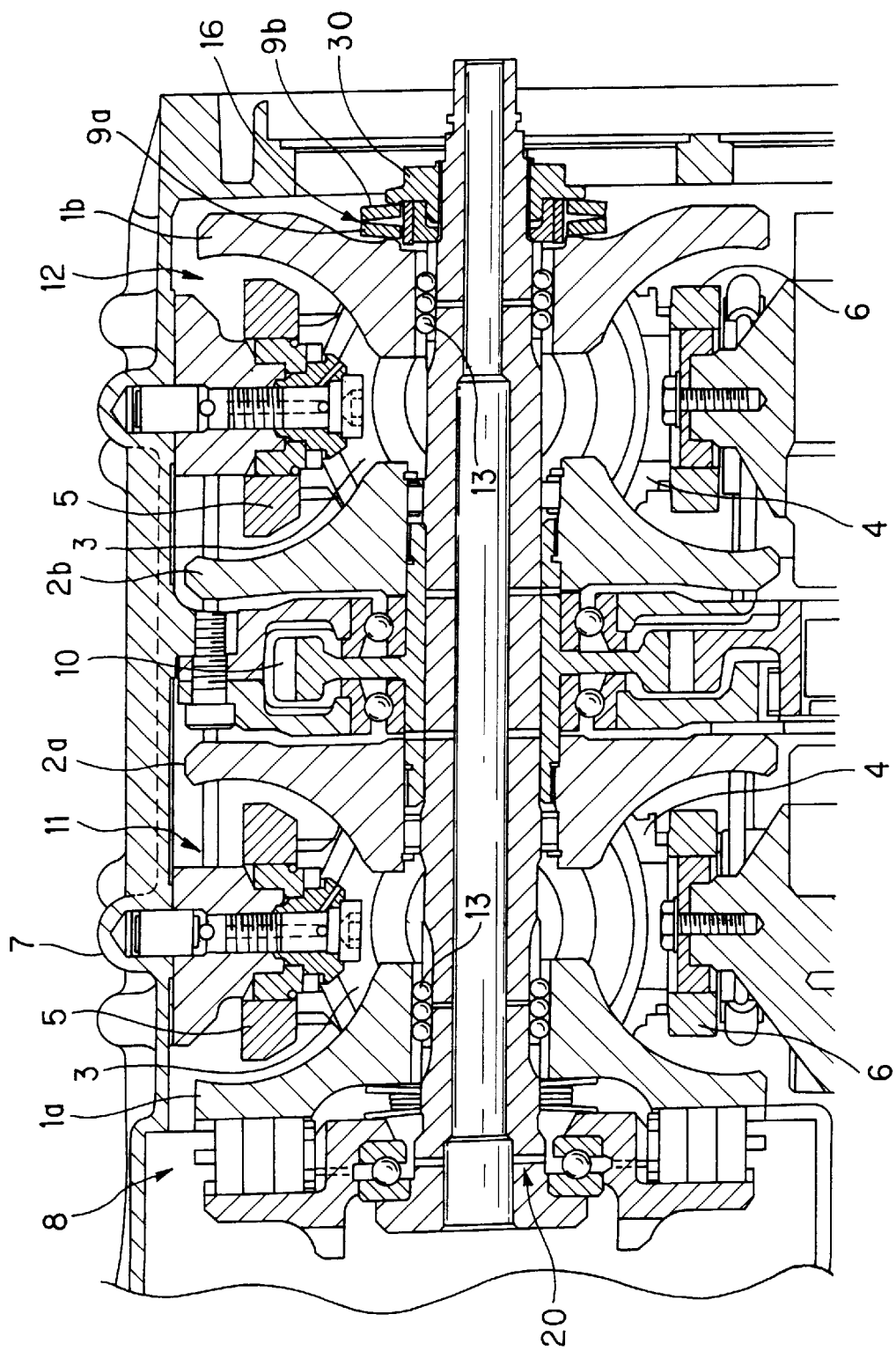
FIG. 1 is a longitudinal sectional view of a toroidal continuously variable transmission according to this invention.

Referring to FIG. 1 of the drawings, a toroidal continuously variable transmission comprises a first toroidal unit 11 and second toroidal unit 12.

In the first toroidal unit 11, a pair of power rollers 3, 3 are gripped between an input disk 1a and output disk 2a. Likewise, in the second toroidal unit 12, the pair of power rollers 3, 3 are gripped between an input disk 1b and output disk 2b.

The input disks 1a, 1b are respectively supported on an input shaft 20 via ball splines 13, 13, and rotate in synchronism.

The output disks 2a, 2b are joined to an output gear 10. The input shaft 20 passes through the output gear 10, and the output disks 2a, 2b rotate relative to the input shaft 20.

The power rollers 3 are respectively supported by trunnions 4. When hydraulic actuators, not shown, displace the trunnions 4 in synchronism in the up/down direction in the figure, the power rollers 3 grate, and the contact radii of the input and output disks with the power rollers 3 vary. The facing trunnions 4, 4 are connected at their upper ends by an upper link 5 and at their lower ends by a lower link 6, and the trunnions 4, 4 displace in mutually opposite directions.

Lubricating oil is provided between the disks 1a, 1b, 2a, 2b and power rollers 3. The oil film between the disks 1a, 1b, 2a, 2b and the power roller 3 is vitrified under high pressure. The drive force is transmitted by the shear force working on this oil film. Loading cams 8, which generate a thrust load according to the input torque input into the torque and exert this load on the disks 1a, 2a, 1b and 2b, are provided on the left side of the input disk 1a in the figure.

A preloading mechanism 16 which supplies a preload required to grip the power rollers 3 even when the input torque is small or zero, is provided on the right side of the input disk 1b in the figure.

Figure 2:
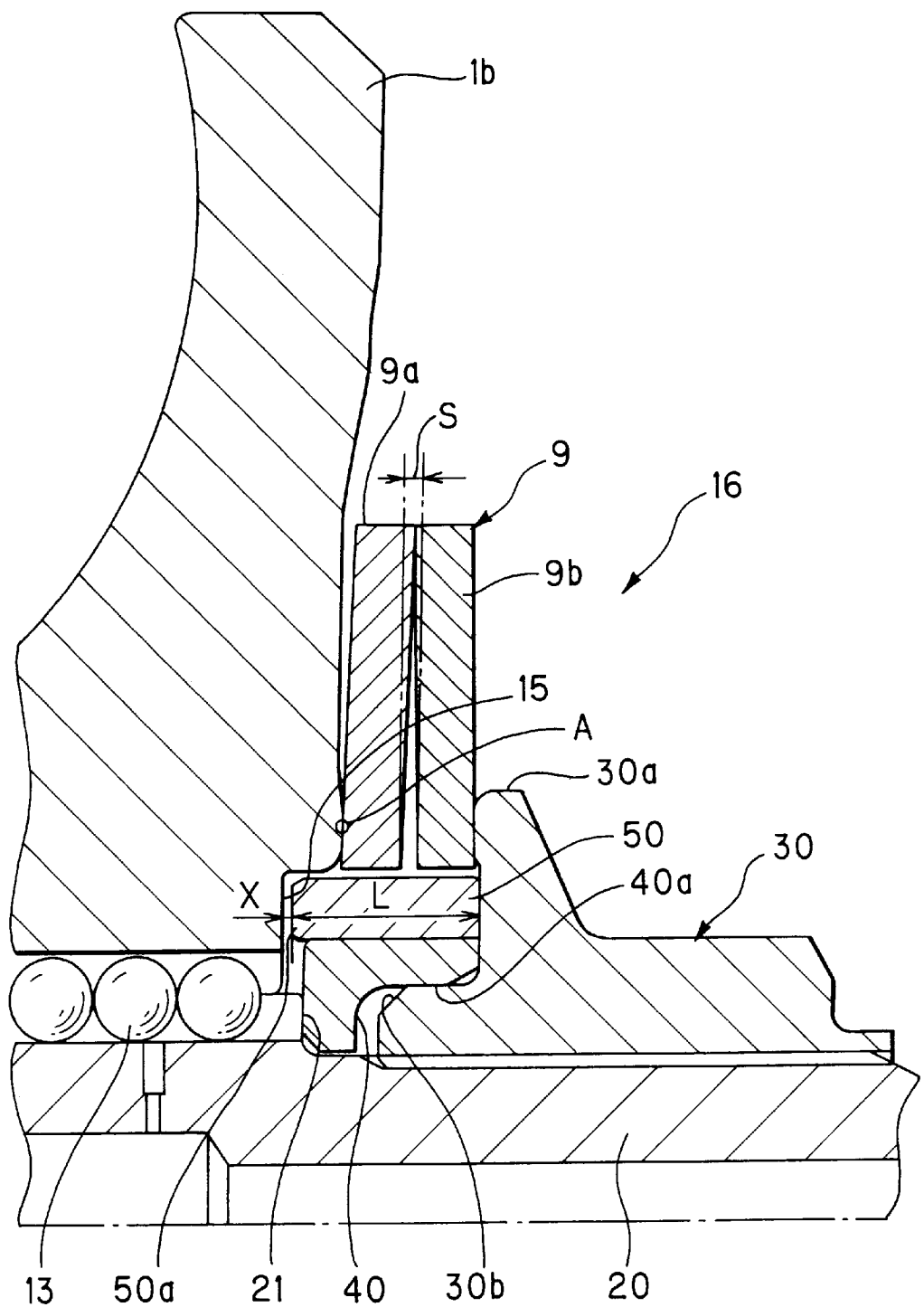
FIG. 2 is a longitudinal sectional view of a preloading mechanism of the transmission.

As shown in FIG. 2, the preloading mechanism 16 comprises a cylindrical spacer 50, a nut 30 comprising a flange 30a and an elastic member 9. The nut 30 is screwed on the input shaft 20. The elastic member 9 comprises belleville springs 9a, 9b gripped between the flange 30a and input disk 1b. The belleville springs 9a, 9b are also fitted on the outer circumference of the cylindrical spacer 50 which prevents the springs 9a, 9b from being excessively pressed against each other, while allowing the springs 9a, 9b to exert a predetermined preload on the input disk 1b.

In order to set the preload of the springs 9a, 9b, a collar 40 is fitted on the outer circumference of the input shaft 20 and gripped between a step 21 of the input shaft 20 and the flange 30a of the nut 30. The collar 40 also comes in contact with the outer circumference of a projection 30b of the nut 30.

An annular depression 15 is formed on the rear face near the inner circumference of the input disk 1b so as to accommodate a part of the spacer 50. The outer diameter of the depression 15 is larger than the outer diameter of the spacer 50, and the input disk 1b and the spacer 50 displace relative to each other in the axial direction.

The belleville spring 9a is in contact with the input disk 1b at a position further toward the outer circumference than the depression 15. The contact point of the belleville spring 9a and input disk 1b is indicated by a letter A in the figure.

The spacer 50 is fitted to the outer circumference of the collar 40, and is provided between the input disk 1b and flange 30a. The length L of the spacer 50 in the axial direction is preset so that even if the input disk 1b displaces toward the tight-hand side of the figure, an end 50a of the spacer 50 comes in contact with the bottom of the depression 15 before the clearance S of the belleville springs 9a, 9b becomes zero, and the clearance S is always greater than a predetermined value.

Therefore, according to the above construction, when the gyration angles of the power rollers 3 correspond to the minimum speed ratio and the input torque is zero, the input disk 1b is furthest to the left of the figure, and a predetermined clearance X is formed between the end face 50a of the spacer 50 and the bottom of the depression 15. At this time, the clearance X is less than the clearance S of the belleville springs 9a, 9b.

If the power roller 3 is gyrated and the speed ratio is increased from this state, the input disk 1b displaces toward the right of the figure and the clearance S of the belleville springs 9a, 9b decreases, but the clearance S is always larger than the clearance X.

If the input disk 1b displaces further toward the right, the end face 50a of the spacer 50 comes in contact with the bottom of the depression 15 before the belleville springs 9a, 9b come into close contact with each other, so no further displacement of the input disk 1b occurs. The clearance S of the belleville springs 9a, 9b is never zero, and the belleville springs 9a, 9b never come into close contact.

Therefore, even if the input torque becomes large, and the input disk 1b bends and inclines towards the right of the figure, the belleville spring 9a can still displace in the all direction, so it is unlikely that the input disk 1b and Belleville spring 9a will rub against each other.

As a result, abrasion of the belleville spring 9a is prevented, and variation of the preload generated by the preloading mechanism 16 is prevented.

Moreover, when the belleville spring 9a is attached to the outer circumference of the spacer 50, the inner diameter of the belleville spring 9a increases and the contact radius of the input disk 1b and belleville spring 9a increases. This increases the stability of the supporting structure of the input disk 1b.

Figure 3:
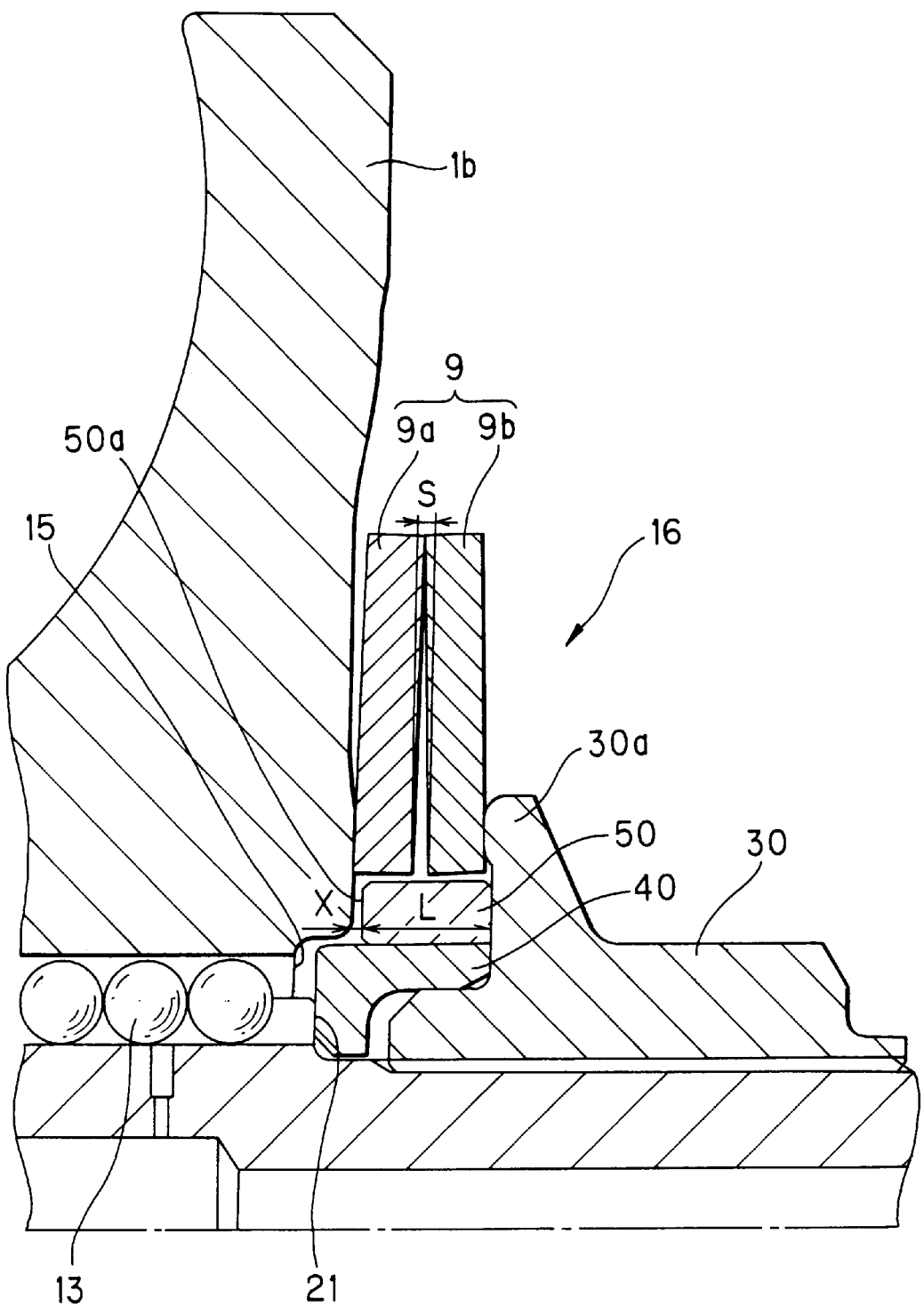
FIG. 3 is similar to FIG. 2, but showing a second embodiment of this invention.

FIG. 3 shows a second embodiment.

This embodiment differs from the first embodiment in that the diameter of the depression 15 is set smaller than the outer diameter of the spacer 50 and larger than the outer diameter of the collar 40, and only the collar 40 on the left of the figure is accommodated in the depression 15. The remaining features of the construction are the same as those of the first embodiment.

In this case also, when the input disk 1b is displaced to the right of the figure, the belleville springs 9a, 9b are prevented from coming into close contact. Moreover, according to this embodiment, the diameter of the depression 15 is smaller than in the first embodiment, and the rigidity of the input disk 1b is enhanced.

Figure 4:
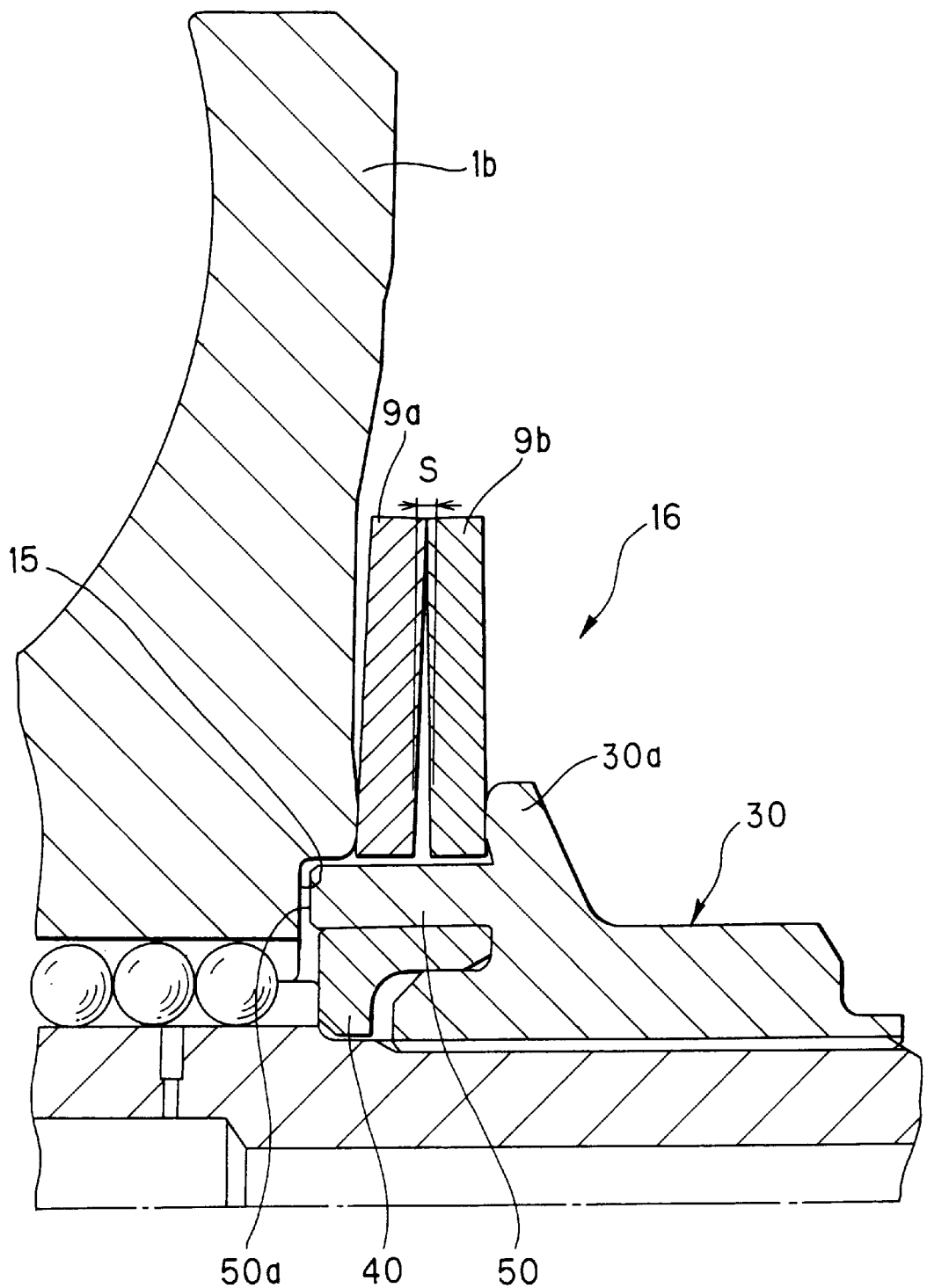
FIG. 4 is similar to FIG. 2, but showing a third embodiment of this invention.

FIG. 4 shows a third embodiment.

This embodiment differs from the first embodiment in that the spacer 50 and the nut 30 are formed in one piece, and the spacer 50 is made to project from the flange 30a of the nut 30. The remaining features of the construction are the same as those of the first embodiment.

In this case also, the belleville springs 9a, 9b are prevented from coming into close contact. Moreover, as the spacer 50 and nut 30 are formed in one piece, the number of components is reduced.

Figure 5:
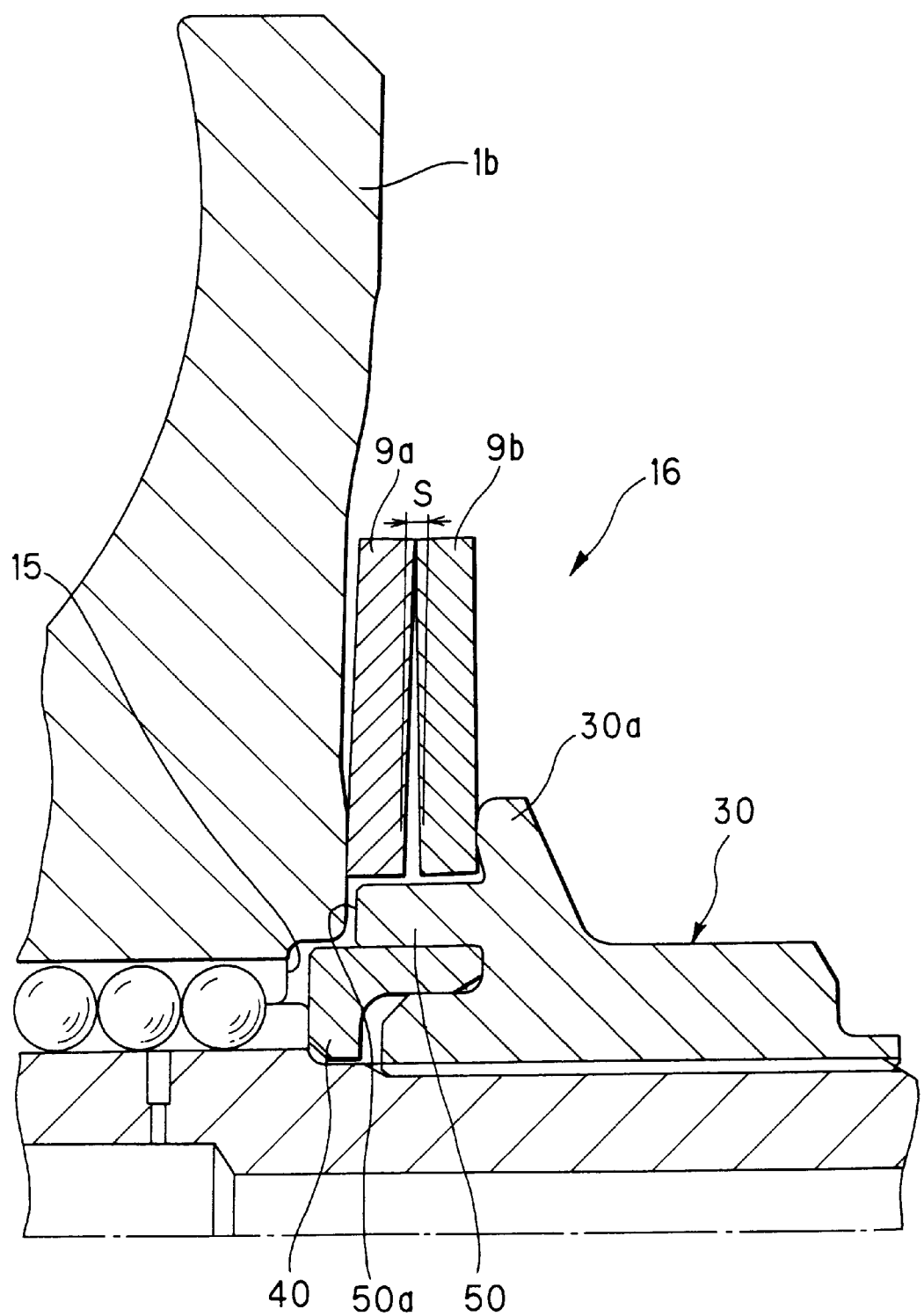
FIG. 5 is similar to FIG. 2, but showing a fourth embodiment of this invention.

FIG. 5 shows a fourth embodiment.

This embodiment differs from the second embodiment in that the spacer 50 and nut 30 are formed in one piece, and the spacer 50 is made to project from the flange 30a of the nut 30. The remaining features of the construction are the same as those of the second embodiment.

In this case also, the belleville springs 9a, 9b are prevented from coming into close contact. Moreover, as the spacer 50 and nut 30 are formed in one piece, the number of components is reduced.

According to the above embodiments, the disks 1a, 1b are input disks and the disks 2a, 2b are output disks, but the disks 1a, 1b may be output disks and the disks 2a, 2b may be input disks. In this case, the gear 10 is used as an input gear and the shaft 20 is used as an output shaft.

The entire contents of Japanese Patent Application P10-243803 (filed Aug. 28, 1998) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed:

1. A toroidal continuously variable transmission comprising:

an input disk;

an output disk;

a power roller gripped between said input disk and said output disk;

a loading mechanism which generates a thrust load according to an input torque input into said transmission, and applies said thrust load to said disks;

an elastic member which comes in contact with a specific disk of said disks and applies a preload to said disks; and a limiting member which limits a displacement of said specific disk in a compressing direction of said elastic member;

wherein said elastic member comprises a first belleville spring and a second belleville spring which come in contact on their outer circumferences and are disposed so as to leave a clearance between their inner circumferences and are disposed so as to leave a clearance between their inner circumferences, and said limiting member limits the displacement of said specific disk so that said clearance is always greater than a predetermined value, and wherein said clearance of said belleville springs is larger than a clearance between said limiting member and said specific disk.

2. A toroidal continuously variable transmission comprising:

an input disk;

an output disk;

a power roller gripped between said input disk and said output disk;

a loading mechanism which generates a thrust load according to an input torque input into said transmission, and applies said thrust load to said disks;

an elastic member which comes in contact with a specific disk of said disks and applies a preload to said disks;

a limiting member which limits a displacement of said specific disk in a compressing direction of said elastic member; and a collar fitted on an outer circumference of a shaft connected to said specific disk, wherein the limiting member is fitted on an outer circumference of the collar, wherein said elastic member comprises a first belleville spring and a second belleville spring which come in contact on their outer circumferences and are disposed so as to leave a clearance between their inner circumferences and are disposed so as to leave a clearance between their inner circumferences, and said limiting member limits the displacement of said specific disk so that said clearance is always greater than a predetermined value, and wherein said clearance of said belleville springs is larger than a clearance between said limiting member and said specific disk.

* * * * *